United States Patent [19]

Eischeid

[11] Patent Number: 5,718,547
[45] Date of Patent: Feb. 17, 1998

[54] SECURING DEVICE FOR A BLIND UNDERCUT BORE

[76] Inventor: Karl Eischeid, Schulweg 23, D-51766, Engelskirchen, Germany

[21] Appl. No.: 507,344

[22] PCT Filed: Feb. 4, 1994

[86] PCT No.: PCT/DE94/00107

§ 371 Date: Aug. 15, 1995

§ 102(e) Date: Aug. 15, 1995

[87] PCT Pub. No.: WO94/19613

PCT Pub. Date: Sep. 1, 1994

[30] Foreign Application Priority Data

Feb. 17, 1993 [DE] Germany .......... 93 02 257 U
May 7, 1993 [DE] Germany .......... 93 06 937 U

[51] Int. Cl.⁶ ............................................. F16B 13/04
[52] U.S. Cl. ........................ 411/48; 411/41; 411/45; 411/60
[58] Field of Search ............................ 411/45, 48, 41, 411/60, 82, 258, 542, 915

[56] References Cited

U.S. PATENT DOCUMENTS

| 2,344,717 | 3/1944 | Rivet . | |
|---|---|---|---|
| 2,956,468 | 10/1960 | Macy | 411/41 |
| 3,443,474 | 5/1969 | Blakeley et al. | 411/41 |
| 3,993,277 | 11/1976 | Harley | 411/41 |
| 4,391,559 | 7/1983 | Mizusawa . | |
| 4,405,272 | 9/1983 | Wollar | 411/41 |
| 4,595,324 | 6/1986 | Sadri | 411/41 |
| 4,702,657 | 10/1987 | Jelinek | 411/542 |
| 4,712,957 | 12/1987 | Edwards et al. | 411/258 |
| 5,030,051 | 7/1991 | Kaneko et al. | 411/41 |
| 5,135,341 | 8/1992 | Leyder | 411/55 |
| 5,370,484 | 12/1994 | Morikawa et al. | 411/41 |

FOREIGN PATENT DOCUMENTS

| 0 439 706 | 8/1991 | European Pat. Off. . |
| 0 452 746 | 10/1991 | European Pat. Off. . |
| 1 450 932 | 3/1969 | Germany . |
| 26 52 630 | 5/1978 | Germany . |
| 34 42 547 | 5/1986 | Germany . |
| 8 802 421 | 2/1988 | Germany . |
| 92 14 581 | 1/1993 | Germany . |
| 562444 | 3/1943 | United Kingdom . |

*Primary Examiner*—Steven N. Meyers
*Assistant Examiner*—Fredrick Conley
*Attorney, Agent, or Firm*—Herbert Dubno; Andrew Wilford

[57] ABSTRACT

A device for securing a holder to a bore support formed with an undercut blind bore has a sleeve-like plug and a bolt received therein. The plug is formed with a central axis-defining passage having a smooth inner wall, a plurality of axially extending and radially throughgoing slits open at an inner end of the plug and defining a plurality of axially inwardly extending and radially deflectable tongues, and an annularly continuous outer portion from which the tongues extend. The bolt has a smooth outer surface and is shaped and dimensioned to fit complementarily into the passage with outward deflection of the tongues. The bolt and passage are of generally the same axial length so that when fully inserted in the passage the bolt is flush with the outer portion.

16 Claims, 3 Drawing Sheets

SECURING DEVICE FOR A BLIND UNDERCUT BORE

CROSS REFERENCE TO RELATED APPLICATIONS

This application is the US national phase of PCT. application PCT/DE94/00107 filed 4 Feb. 1994 with a claim to the priority of German application G 93 02 257.2 itself filed 17 Feb. 1993.

FIELD OF THE INVENTION

The invention relates to a securing device for a blind undercut bore in which is arranged an anchor plug longitudinally slit toward the floor of the bore and which is provided on its inner end with spreadable tongues having a shape corresponding to the undercut of the bore and which has a coaxial passage for insertion of a bolt which engages the spreadable tongues over substantially all of their overall length.

BACKGROUND OF THE INVENTION

Such a securing device is known from EP 0,336,183. It is intended for mounting a threaded part. Accordingly the plug or its bore has an internal screwthread in which the threaded part can be screwed. In this way the spreadable tongues that are pushed together for insertion of the plug into the bore are spread as long as the elasticity of the material of the plug does not allow for an automatic spreading of the spreadable tongues when the plug is installed. When the threaded part is screwed in it transmits spreading force to the plug. The front edge of the threaded part presses against unspread regions of the plug. As a result it is not uncommon that the threaded engagement between the threaded part and the plug is damaged and the spreadable tongues are not spread or are only partially spread. This is in particular the case when the plug has not been inserted deeply enough or when because of some tolerance problems during formation of the bore this is not radially and/or axially big enough. In these cases it is hard to prevent that the known threaded part does not get screwed in deeply enough. Such a problem crops up because the threaded part projects out of the bore in order to secure a mounted part, for instance a holding plate, which is connected via a threaded nut with the bore support. In this way one gets an insufficiently solid and as a result not strong load-bearing connection between the bore support and the object being mounted. In addition this can lead to damage to the bore support when the threaded part is threaded with excessive force into the plug and same bursts the bore support because it is correspondingly sensitive. Such sensitivity is particularly present when the bore support is a thin plate for which the securing device is in particular intended. The bore support can also be a ceramic plate which can be broken by incorrect use of the known securing device.

OBJECTS OF THE INVENTION

It is therefore an object of the invention to improve on a securing device of the above-described type so that it provides a good and easily monitored mounting possibility in particular with thin plates as bore supports and which is easier to install.

SUMMARY OF THE INVENTION

This object is attained in that the bolt is a drive bolt free of external screwthreads on its outer surface and has an outer end that is arranged generally axially flush with the outer end of the plug.

It is important for the invention that the bolt is a drive bolt with a smooth outer surface. It can therefore simply be driven into the plug. This way it spreads the spreadable tongues of the plug so long as they are not sprung into the undercut and holds the spreadable tongues in the undercuts of the bore when it is fully driven in, when its outer end is flush with the outer end of the plug. If the plug is not fully inserted into the bore, the complete insertion of the plug will take place with the driving-in of the bolt. To this end an angling of the undercuts is particularly effective. The resultant friction between the outer surface of the bolt and the inner wall of the bore of the plug are sufficient to axially drive in same. An axial interengagement between the bolt and the plug comparable to the threaded engagement of the known threaded part in the inner thread of the known plug, does not exist. The plug therefore does not serve as an abutment for the movement of the bolt. This decoupling permits therefore an advantageous positioning of the plug during driving in of the bolt. In addition driving the bolt can be done much more quickly than screwing in the threaded part. The use of a screwdriver is unnecessary. Should the undercutting of the bore not be sufficiently dimensioned for the spreadable tongues, the bolt will not be driven all the way in and it is clearly visible that the mounting is not of the desired quality.

Preferably the plug is just as long as the bore and the bolt is just as long as the plug. In this manner the plug or its spreadable tongues are supported over their entire length even in the region in which the spreadable tongues are supported on the outer wall portions of the undercut. As a result of the exact length of the bolt it is somewhat more widely spaced from the floor of the bore than the plug. The bolt cannot as a result be engaged with the floor of the bore and there destroy the bore support, which can be a thin ceramic plate.

It is particularly advantageous that the plug has on its outer plug end an annular collar that if necessary projects radially more than the spreadable tongues of the plug. The annular collar projects radially all around from the periphery of the plug. When the plug for example traverses a bore of the object being mounted, the annular collar can be solidly braced on the object being mounted. The annular collar projecting equally in all direction from the circumference of the plug also insures support on such objects to be mounted that are not formed in the same axially symmetrical way but for example have a four-sided mounting hole.

When the centering device is used for plates, for example for ceramic tiles of the 60 cm×60 cm size which are also very thin, namely less than 12 mm thick, the securing device is set up so that the annular collar engages a holder to be joined with the bore support. For example four securing devices are used in order to hold a plate with four holders on a below-ground construction.

In order to mount the bore support elastically relative to the holder and to hold the entire securing device under tension it is built such that between the bore support and the holder there is an elastic intermediate layer with which the holder is pressed against the annular collar of the plug set in the bore support. The elastic intermediate layer is thus thicker than the space available for it between the bore support and the holder. It is therefore compressed when the bolt is driven into the plug which thus stays in its end position inside the bore so that the holder presses with its annular collar against the intermediate layer pressed against the bore support.

In addition the securing device can be formed so that the longitudinal slits of the plug end outside the thickness of the annular collar. As a result of this the annular collar is not weakened or interrupted by longitudinal grooves. On the other hand the spreadable tongues of the plug formed by the longitudinal slits are not reinforced by sections of the annular collar since when pressed together, in particular during spreading of the tongues by the bolt, this could be a hindrance.

It is normally the rule that the bolt does not need to be particularly secured in its driven-in position. The bolt is clamped in the plug. Specific conditions can exist however under which precautions for greater securing must be taken in order to insure that the bolt cannot be pulled under certain circumstances out of the plug.

An easy-to-make formation of the bolt to secure its position in the plug is obtained when the bolt has on its outer end barbs that can bite into the plug. The barbs engage in the material of the plug and prevent the bolt from being displaced toward the driving-in device.

The simplest form of the bolt is cylindrical. In order to make this bolt shape, extruded material is cut to length. Such cylindrical bolts can be secured in their driven-in position by being glued to the plug.

When the particular problem is presented that the bolt must under no conditions be driven too deeply in because it then for example it tends to rebound, the securing device is constructed such that the bolt has on its outer end a radially projecting depth stop whose outer diameter corresponds to the outer diameter of the annular collar of the plug. The depth stop insures that the bolt can be driven at most into its intended position but no further. The depth stop insures without difficulty a way of optically determining if the bolt has not been driven deeply enough into the plug. The depth stop has in addition the further advantage that it can be used for gluing the bolt with the plug, in particular when it is formed as a plate. No glue need be introduced into the bore, rather it is sufficient to apply the glue to the surface turned toward the depth stop or to the plug engagement surface of the depth stop which is optimally big enough when the outer diameters of the depth stop and of the annular collar are the same.

In order to securely position the bolt in the plug even when the bolt is not glued with the plug or fixed with the plug, the securing device is built such that a safety cap engages over the bolt and if necessary is glued to it and/or to the annular collar and is clipped with the annular collar of the plug. Clipping the safety cap with the plug insures support of the bolt against moving out from its intended position.

The device can be formed such that the bolt has on its inner end a flat annular projection which when the bolt is installed snaps into an annular groove formed on an inner end of the plug. This forms an axially solid connection between the bolt and the plug which serves for good positioning of the bolt. The snap connection can be created by tight tolerances in that the annular projection must overcome clamping forces of the plug to be driven into its intended position in which the annular projection snaps into the annular groove. The snap connection can also be set up such that the bolt is slipped without overcoming clamping forces of the plug into its intended position in which the axially effective securing forces on the plug serve for the axial securing of the annular projection of the bolt in an annular groove of the plug. In this case it is advantageous to form the device so that the half of the metallic bolt having the annular projection is generally conical. The conical part of the bolt permits confronting regions of the plug to be pushed together until they lie on the conical surface of the bolt so that the annular groove is trapped.

BRIEF DESCRIPTION OF THE DRAWING

The invention is described with reference to an embodiment shown in the drawing. There is shown in.

SPECIFIC DESCRIPTION

Figure 1:
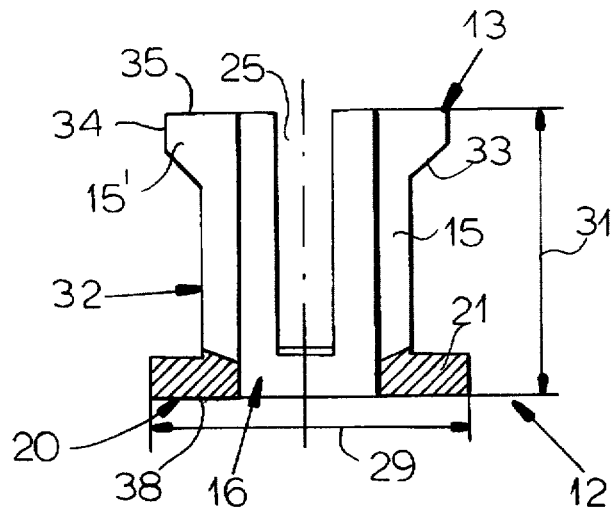
FIG. 1 a section through an anchor plug for a securing device according to the invention.

Generally the device secures construction parts which have tolerances required for the securing. It is also desirable to make the device such that it has a relatively wide application range, that is so it can be used with differently dimensioned parts. In order to facilitate this the device is made such that the annular collar 21 of the plug 12 has a screwthread 44 on which a tightening nut 45 can be screwed coaxially with the plug to secure the holder 23 on the bore support 22. As a result of the adjustability of the nut on the screwthread of the plug one can apply it to greater axial tolerances and spacings by setting the nut without having to change the device.

The anchor plug 12 shown in FIG. 1 is generally formed of a hollow cylindrical sleeve 32 with a smooth throughgoing passage 16. An annular collar 21 is provided on the outer anchor end 20 which projects radially uniformly. The other inner end 13 of the plug 12 has four longitudinal slits 25 which are uniformly spaced. The longitudinal slits 25 are thus uniformly distributed about the periphery. They extend axially into the region of the annular collar 21 without entering into it. This forms four spreadable tongues 15 which are provided in the region of the end 13 of the plug 12 with radial projections 15'. These projections 15' together create an annular collar subdivided by the longitudinal slits 25 and which has conical transition surfaces 33 between the larger outer diameter 34 of the projections 15' and the diameter of the sleeve 32 in its cylindrical region. The inner anchor end 13 has an inner end surface 35 which is parallel to the outer end surface 38 of the outer anchor end 20.

Figure 2:
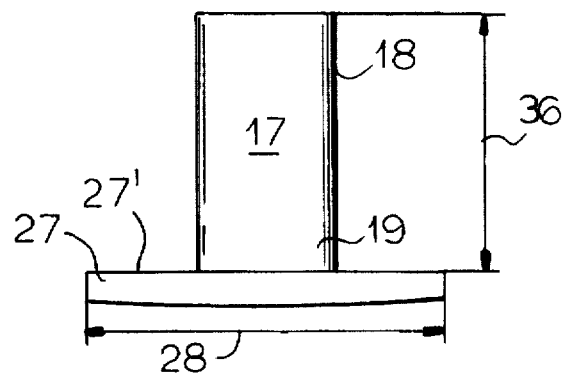
FIGS. 2, 3, and 4 various embodiments of bolts which are built to work with an anchor plug according to FIG. 1.
Figure 3:
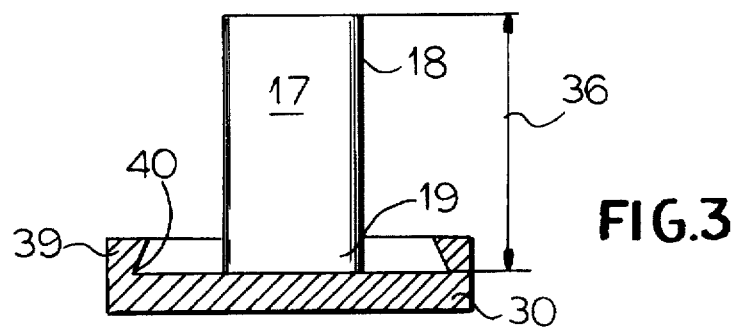
Figure 4:
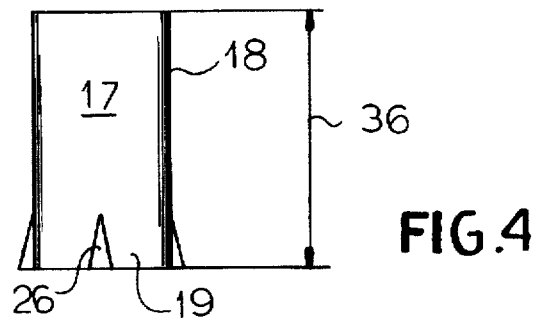

The bolts 17 shown in FIGS. 2 through 4 all have a smooth outer surface 18. The diameter of the bolt 17 or of the surface 18 corresponds to the diameter of the passage 16 of the plug 12 such that the bolt 17 can be fitted snugly into the passage 16.

The bolt 17 is almost the same length as the anchor. Its length 36 is slightly less than the length 31 of the anchor by about 0.5 mm. In addition the inner anchor end 13 or its inner end surface 35 is set at a spacing of e.g. 0.5 mm from the floor 41 of the bore. These dimensions are sufficient for a bolt diameter of e.g. 5 mm. In the fully inserted position of the bolt 17 the inner bolt end 42 is still sufficiently spaced from the bore floor 41 to insure that if the bolt 17 is driven too deeply into the plug 12 it does not destroy the bore support 22.

Going further, the bolts 17 of FIGS. 2 through 4 are different as follows: The bolt 17 of FIG. 2 has on its outer end 19 a depth stop 27. This is formed like a plate and has an outer diameter 28 which corresponds the outside diameter 29 of the annular collar 21 of the plug 12. The depth stop 27 insures that the bolt 17 does not get driven too deeply into the plug 12. It further allows monitoring if the bolt 17 has been driven deeply enough into the plug 12 by showing the tight no-gap engagement of the depth stop 27 on the annular collar 21. In addition the abutment surface 27' of the depth stop 27 can also be used to form an additional means of securing the bolt 17 that is one piece with the depth stop 27 in that this depth stop 27 is glued with the outer end surface 38 of the outer anchor end 20.

Figure 5:
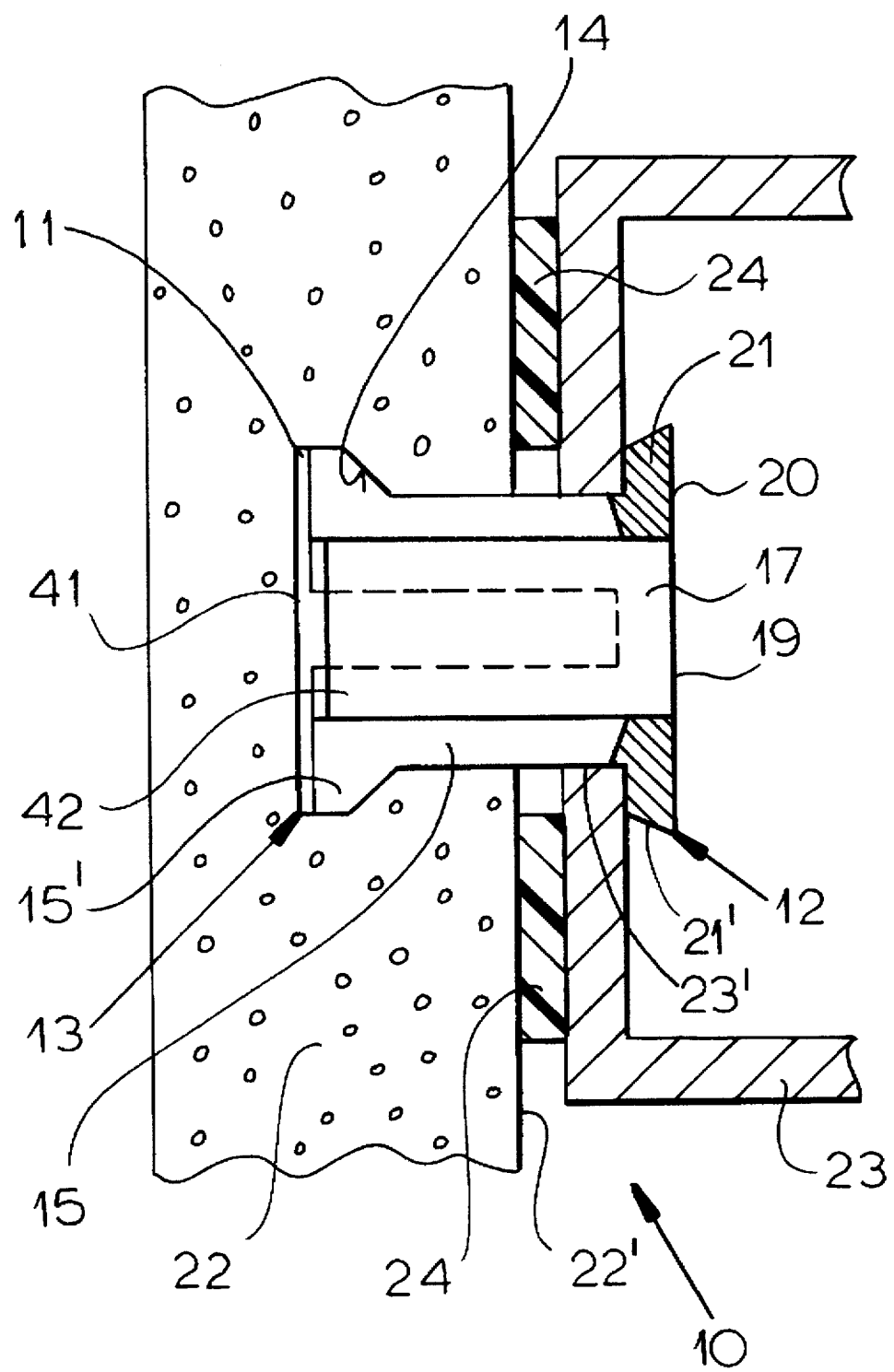
FIG. 5 a section through a complete mounted securing device of a thin ceramic plate.

The bolt 17 shown in FIG. 3 is used with a safety cap 30 which has a snap edge 30 centered on the bolt axis and annularly shaped to grip over the annular collar 21 of the plug 12. The wall forming the snap edge 39 is wider on its free edge than in its inner regions so as to form a corresponding annular undercut 50. As a result the safety cap 30 can be solidly connected with the annular collar 21 in particular when the annular collar is correspondingly shaped conically as shown in FIG. 5 in the region of the outer periphery 21' of the annular collar 21. Even here an improved solid seat of the bolt 17 in the plug can be obtained when the safety cap 30 is glued with the bolt and/or with the annular collar 21 of the plug.

The bolt 17 shown in FIG. 4 is provided on its outer end 19 with barbs 25 uniformly distributed around the outer periphery. When the bolt 17 is driven in these bite into the material of the anchor plug 12 and catch there so as to insure a sure seating of the bolt 17 in the plug 12.

The materials of the plug 12 and of the bolt 17 are selected according to the respective requirements. If the bore support which receives the plug 12 is of a sensitive for example fragile material, the plug 12 is for example made of an appropriate plastic which has the necessary resilience. It is also possible to use metallic plugs which are for example made of aluminum or an aluminum alloy or of brass or of high-grade steel. These materials must be on the one hand sufficiently elastic that one can deform the sleeve 32 or the spreadable tongues 15 of the plug 12 in order that they can slide into the bore of the bore support in spite of their projections 15' where they are again bent out when the bolt 17 is driven into the anchor plug 12. In addition the plug material must be sufficiently soft that it can deform without breaking and can also support the necessary tension which is required in order to make a permanent mount. In addition the material of the bolt 17 should be soft with respect to impact. It is also possible to used plastics, aluminum materials, or high-grade steel materials for this material.

FIG. 5 shows a securing device 10 which is fitted into an undercut bore 11 of a bore support 22. This bore support is a ceramic plate. The bore 11 formed in it is provided with an undercut 15, that is its radius increases inward. Such an undercut bore can be made with the device described in German 3,811,249. As it is made a planar or nearly planar bore floor 41 is formed in order to leave the residual wall thickness of the bore support 22 as great as possible. Correspondingly the bore 11 is so dimensioned that the plug 12 set in its has its inner end 13 closely juxtaposed with the bore floor 41.

As a result of the engagement of its projections 15' in the undercut 14 the plug 12 together with the annular collar 21 secures a holder 21 and an elastic intermediate layer 24 on the inner face 22' of the bore support 22. The holder 23 is a generic part with which the bore support 22 is to be held. To this end the holder 23 is connected with an unillustrated lower construction, e.g. a housing outer wall. A cutout 23' for example a bore, must be so large that the inner anchor end 13 with its spreadable tongues 15 can be poked through. To this end a bore diameter is sufficient which corresponds to that of the bore 11. Then on insertion of the plug 12 in the bore 11 the spreadable tongues 15 must be pushed together enough so that they can be pushed both through the cutout 23' of the holder 23 and also through the holder-side region of the bore 11 into the region of the undercut 14. Then the annular collar 21 lies snugly on the holder as shown. The elastic intermediate layer is installed beforehand on the holder 23, e.g. with an elastic coating that allows the intermediate layer 24 to be glued to the smooth bore side face of the holder 23. According to FIG. 5 two separate intermediate layers 24 are used which are arranged diagonally across from each other on the holder 23 and can be for example made from corresponding long straps 23 like the holder 23. It can also be a ring.

The complete insertion of the plug 12 into the bore 11 insures that the projections 15' of the spreadable tongues 15 are arranged in the region of the undercut 14 where they still have to be spread. This is done by driving the bolt 17 into the position shown in FIG. 5. Spreading of the spreadable tongues 15 pushes the conical transition surfaces 33 shown in FIG. 1 against the corresponding conical surfaces of the undercut 15 shown in FIG. 5. With further driving of the bolt 17 these surfaces slide on one another and thus draw the plug 12 inward with its annular collar 21 toward the face 22' of the bore support 22 until the elastic intermediate layer 24 is compressed by the holder 23. Once the bolt 17 has reached the end position of FIG. 5 the elastic intermediate layers 23 set the holder 23 under pressure which is transmitted via the annular collar 21 to the plug 12 which is under tension. The spreadable tongues 15 push as a result of their conically shaped transition surfaces 33 radially on the bolt 17 and hold the inner end of same solidly. The corresponding position of the bolt 17 can be easily monitored because the outer end 19 of the bolt 17 must be flush with the outer plug end 20. The two end surfaces must be aligned.

Driving in the bolt 17 puts the plug 12 into its installed position. No further steps need be taken in order to connect the holder 23 and the bore support 22 to each other. The tightening together by the elastic intermediate layers 24 is not however only relevant for the above-described mounting position of the holder 23 and of the bore support but also provides a mutual elasticity which is particularly significant for the long-term life of the connection in particular with fragile bore supports. The undercut 14 and the projections 15' of the spreadable tongues 15 can work together like a ball joint when the elasticity of the plug material or the tolerances of the bore 11 and of the outer diameter of the sleeve 32 in the cylindrical region permit.

Figure 6:
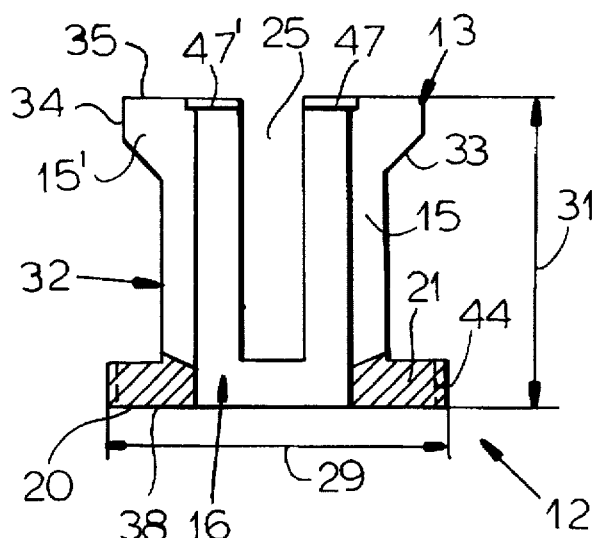
FIG. 6 a section through a further anchor plug according to the invention.
Figure 7:
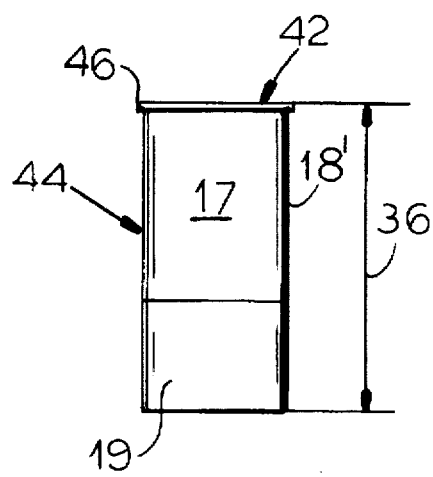
FIG. 7 a bolt that works with the anchor plug of FIG. 6.

The plug 12 shown in FIG. 6 is characterized in that where it is not interrupted on its inner end 13 it has an annular groove 47. The bolt 17 for this plug 12 has according to FIG. 7 on its inner end 42 a flat annular projection 46 that fits complementarily in the annular groove 47. The dimensions of the bolt 17 or the outer diameter of its annular projection 46 are such that the latter can be driven into its passage 16 while overcoming the elastic forces of the plug 12 until the desired axial snap fit is produced. The dimensions can also be such that the outer diameter of the annular projection 46 is equal to the bore diameter so that the bolt 17 can be set into the bore without having to overcome frictional forces. The outer surface 18' has toward the annular projection a conical shape so that the spreadable tongues 15 can be drawn inward by the securing until the annular projection 47 with its radial surfaces 47' engages underneath the projection 46. Such a shape is particularly advantages when the plug 12 is subjected to axial forces which stress the conical transition surfaces 33 of the plug 12 together with the corresponding surfaces of the undercut 14 for pushing together the spreadable tongues 15.

Figure 8:
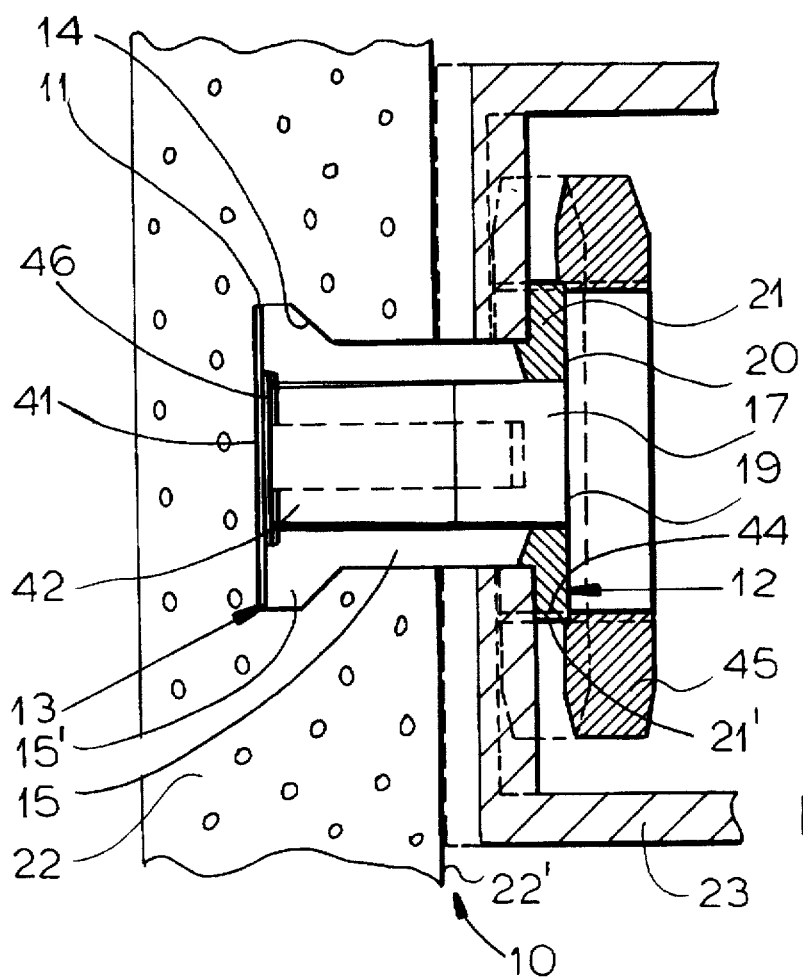
FIG. 8 an overall view like FIG. 6 showing the anchor plug of FIG. 6 and the bolt of FIG. 7.

The above-described axial load forces of the plug 12 can be produced specifically in a particular range when an annular collar 21 of the plug 12 has an outside thread 44 on which a nut can be screwed coaxially. FIG. 8 shows such a construction wherein between the annular collar 21 of the plug 12 and a bore support 22 there is a holder 23. The arrangement corresponds in this regard that of FIG. 5. The plug 12 is overlong so that the space between its annular collar and the corresponding outer surface of the bore support 22 is substantially greater than the thickness of the holder 23 in this region. As a result the bore support 22 is loose with respect to the secured holder 23. Unlike in FIG. 5 the intermediate layer 24 is not used. The nut 45 can now be screwed down on the collar 21 until it and also the holder reach the illustrated dashed-line relative positions in which the desired mounting is achieved.

I claim:

1. In combination with a bore support formed with an undercut blind bore having a floor and an inner surface at least part of which tappers outward toward the floor a device for securing a holder to the bore support, the device comprising:
   a sleeve-like anchor plug formed with
      a central axis-defining passage having a smooth inner wall,
      a plurality of axially extending and radially throughgoing slits open at an inner end of the plug and defining a plurality of axially inwardly extending and radially deflectable tongues having inner and outer faces, and
      an annularly continuous outer portion from which the tongues extend; and
   a bolt having a smooth outer surface and shaped and dimensioned to fit complementarily into the passage with outward deflection of the tongues from an inner position to an outer position, the tongues being shaped such that in the outer position their outer faces fit complementarily with the inner bore surface and their inner faces fit complementarily with the outer surface of the bolt along a full length of the tongues.

2. The securing device defined in claim 1 wherein the bolt and passage are of generally the same axial length so that when fully inserted in the passage the bolt is flush with the outer portion.

3. The securing device defined in claim 2 wherein the plug is formed at the outer end with a radially outwardly projecting collar that projects radially beyond the tongues.

4. The securing device defined in claim 5 wherein the collar is adapted to press the holder against an outer surface of the support.

5. The securing device defined in claim 4, further comprising
   an elastic intermediate layer between the holder and the outer surface.

6. The securing device defined in claim 3 wherein the slits have outer ends that are axially inward of the collar.

7. The securing device defined in claim 3 wherein the bolt has an inner end provided with barbs that can bite into the plug.

8. The securing device defined in claim 3, further comprising
   glue between the bolt and the plug securing same together.

9. The securing device defined in claim 3 wherein the bolt has an outer end provided with a radially projecting depth stop axially inwardly engageable with the outer end of the plug.

10. The securing device defined in claim 9 wherein the depth stop is a radially projecting flange formed on the bolt outer end and of the same outside diameter as the collar.

11. The securing device defined in claim 3, further comprising
   a safety cap engaged over the bolt and secured to the collar.

12. The securing device defined in claim 3 wherein the outer surface of the bolt and inner surface of the passage are formed with radially interengaging formations.

13. The securing device defined in claim 12 wherein the formations include a radially open groove and a radially projecting ridge.

14. The securing device defined in claim 13 wherein the ridge is formed on the bolt and the groove on the plug.

15. The securing device defined in claim 13 wherein the inner end of the bolt is tapered inward.

16. The securing device defined in claim 3 wherein the collar has an external screwthread, the device further comprising
   a nut threaded on the collar and bearing axially inward on the support.

* * * * *